US009767186B2

(12) United States Patent
Bhandari et al.

(10) Patent No.: US 9,767,186 B2
(45) Date of Patent: Sep. 19, 2017

(54) RETRIEVING A SPECIFIC SENTENCE FROM A DOCUMENT

(71) Applicant: INTERNATIONAL BUSINESS MACHINES CORPORATION, Armonk, NY (US)

(72) Inventors: Harendra Bhandari, Yokohama (JP); Kansaku Nakakura, Tokyo (JP); Lianzi Wen, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 258 days.

(21) Appl. No.: 14/275,994

(22) Filed: May 13, 2014

(65) Prior Publication Data

US 2014/0365475 A1   Dec. 11, 2014

(30) Foreign Application Priority Data

Jun. 11, 2013   (JP) ................................. 2013-122805

(51) Int. Cl.
*G06F 17/30* (2006.01)

(52) U.S. Cl.
CPC .. *G06F 17/30663* (2013.01); *G06F 17/30613* (2013.01); *G06F 17/30696* (2013.01); *G06F 17/30705* (2013.01)

(58) Field of Classification Search
CPC ............... G06F 17/30; G06F 17/30663; G06F 17/30613; G06F 17/30705; G06F 17/30696
USPC ........ 707/722, 723, 728–730, 748, 749, 750
See application file for complete search history.

(56) References Cited

U.S. PATENT DOCUMENTS

| 5,257,186 A | * | 10/1993 | Ukita | ................ G06F 17/30696 715/256 |
| 5,732,260 A | | 3/1998 | Nomiyama | |
| 6,205,456 B1 | | 3/2001 | Nakao | |
| 6,374,209 B1 | * | 4/2002 | Yoshimi | .............. G06F 17/2745 715/243 |
| 6,963,830 B1 | * | 11/2005 | Nakao | ............... G06F 17/30719 715/243 |

(Continued)

FOREIGN PATENT DOCUMENTS

| JP | H11184865 A | 7/1999 |
| JP | H11250089 A | 9/1999 |

(Continued)

*Primary Examiner* — Vincent F Boccio
(74) *Attorney, Agent, or Firm* — Mark G. Edwards

(57) ABSTRACT

An apparatus retrieves and outputs a specific sentence from a document. An acceptance hardware component acquires a retrieval key. An importance calculation hardware component calculates the level of importance of each sentence included in a search target document. A document processing hardware component extracts a sentence including the retrieval key from the search target. A retrieval result processing hardware component corrects a value of importance of each sentence calculated by the importance calculation hardware component for the sentence based on the position of the sentence in the search target document to calculate a corrected level of importance. A display control hardware component outputs the sentence extracted by the document processing hardware component according to the display order based on the corrected level of importance.

9 Claims, 11 Drawing Sheets

(56) References Cited

U.S. PATENT DOCUMENTS

| | | | |
|---|---|---|---|
| 2002/0184267 A1* | 12/2002 | Nakao | G06F 17/30719 715/255 |
| 2004/0267709 A1 | 12/2004 | Ji et al. | |
| 2005/0251394 A1 | 11/2005 | Carro | |
| 2010/0332498 A1 | 12/2010 | Svore et al. | |

FOREIGN PATENT DOCUMENTS

| | | | |
|---|---|---|---|
| JP | 2000112967 A | 4/2000 | |
| JP | 2000222427 A | 8/2000 | |
| JP | 2002108887 A | 4/2002 | |
| JP | 2002251394 A | 9/2002 | |
| JP | 2003196294 A | 7/2003 | |
| JP | 2004062806 A | 2/2004 | |
| JP | 2005234635 A | 9/2005 | |
| JP | 2005250762 A | 9/2005 | |
| JP | 2006285513 A | 10/2006 | |
| JP | 2007200248 A | 8/2007 | |
| JP | 2008269086 A | 11/2008 | |
| JP | 2009217802 A | 9/2009 | |
| JP | 2010266971 A | 7/2010 | |
| JP | 2012118657 A | 6/2012 | |

\* cited by examiner

| SENTENCE | WORD SPACE | SCORE | RELEVANCE |
|---|---|---|---|
| s1: A cat is sitting on a mat. | [ cat, sitting, mat, dog ] | v1: ( cat:1, sitting:1, mat:1, dog:0 ) | v1: v2: 0.66 |
| s2: A dog is sitting on a mat. | | v2: ( cat:0, sitting:1, mat:1, dog:1 ) | v2: v3: 0.86 |
| s3: A cat and a dog are sitting on a mat. | | v3: ( cat:1, sitting:1, mat:1, dog:1 ) | v1: v3: 0.86 |

GRAPH

FIG. 2

$$A = \begin{pmatrix} 0 & 0.66 & 0.86 \\ 0.66 & 0 & 0.86 \\ 0.86 & 0.86 & 0 \end{pmatrix}$$

MATRIX

FIG. 3

RETRIEVING A SPECIFIC SENTENCE FROM A DOCUMENT

BACKGROUND

The present invention relates to an apparatus, a method, and a program for searching a document using a retrieval key and outputting a sentence including the retrieval key.

In a processing system for computerized documents (electronic documents), various searches are done. For example, one known technique is to enter a keyword as a retrieval key and retrieve, from a document set, a document fitting into a topic represented by the keyword. Another conventional technique is to use a document as a retrieval key to extract a document similar to the document from multiple search target documents.

A specific sentence in a document is also extracted based on a keyword. For example, one conventional technique is to retrieve a character string including a set keyword from a search target document based on the keyword. Another conventional technique is to calculate the level of importance based on the importance of a word in sentences, select sentences of high importance, and arrange the selected sentences in the order they appear in an original document so as to create a summary document.

SUMMARY

In one embodiment of the present invention, an apparatus retrieves and outputs a specific sentence included in a document. In one embodiment, the apparatus comprises: a retrieval key acquiring hardware component for acquiring a retrieval key used to search a search target document; an importance calculation hardware component for calculating an initial level of importance of each sentence included in the search target document; an extraction hardware component for searching the search target document using the retrieval key acquired by the retrieval key acquiring hardware component to extract a sentence including the retrieval key from the search target document in order to acquire position information on the extracted sentence in the document; an importance correction hardware component for correcting a value of importance of each sentence calculated by the importance calculation hardware component for the sentence extracted by the extraction hardware component based on the position of the sentence in the search target document obtained by the extraction hardware component to calculate a corrected level of importance; and a retrieval result outputting hardware component for outputting the sentence extracted by the extraction hardware component according to an order based on the corrected level of importance calculated by the importance correction hardware component.

In one embodiment of the present invention, an apparatus retrieves and outputs a specific sentence included in a document. The apparatus in this embodiment comprises: a display hardware component for displaying a document; an acceptance hardware component for accepting a specification of a specific portion in the document displayed on the display hardware component; an extraction hardware component for searching the document using, as a retrieval key, the specific portion in the document accepted by the acceptance hardware component to extract a sentence including the retrieval key from the search target document in order to acquire position information on the extracted sentence in the document; a retrieval result processing hardware component for determining a display order of each sentence extracted by the extraction hardware component based on an initial level of importance determined for the sentence included in the document displayed on the display hardware component based on the number of appearances of a word included in the sentence across the document, and the position information on the sentence extracted by the extraction hardware component; and a display control hardware component for causing the display hardware component to display the sentence extracted by the extraction hardware component according to the display order determined by the retrieval result processing hardware component.

In one embodiment of the present invention, a method retrieves a specific sentence from a document and causing a display hardware component to display the specific sentence on a computer including the display hardware component for displaying the document. The method comprises: accepting, by one or more processors, an input of a retrieval key; searching, by one or more processors, the document based on the accepted retrieval key to extract a sentence including the retrieval key from the search target document in order to acquire position information on the extracted sentence in the document; based on an initial level of importance determined based on the number of appearances of a word included in each sentence across the document and the position information on the sentence extracted based on the retrieval key, determining, by one or more processors, a display order of the sentence included in the document displayed on the display hardware component and extracted based on the retrieval key; and causing, by one or more processors, the display hardware component to display the sentence extracted based on the retrieval key according to the determined display order.

BRIEF DESCRIPTION OF THE SEVERAL VIEWS OF THE DRAWINGS

FIG. 2 is a diagram for describing the relevance among sentences in the embodiment.

FIG. 3 is a diagram showing an adjacency matrix based on a graph shown in FIG. 2.

DETAILED DESCRIPTION

Figure 1:
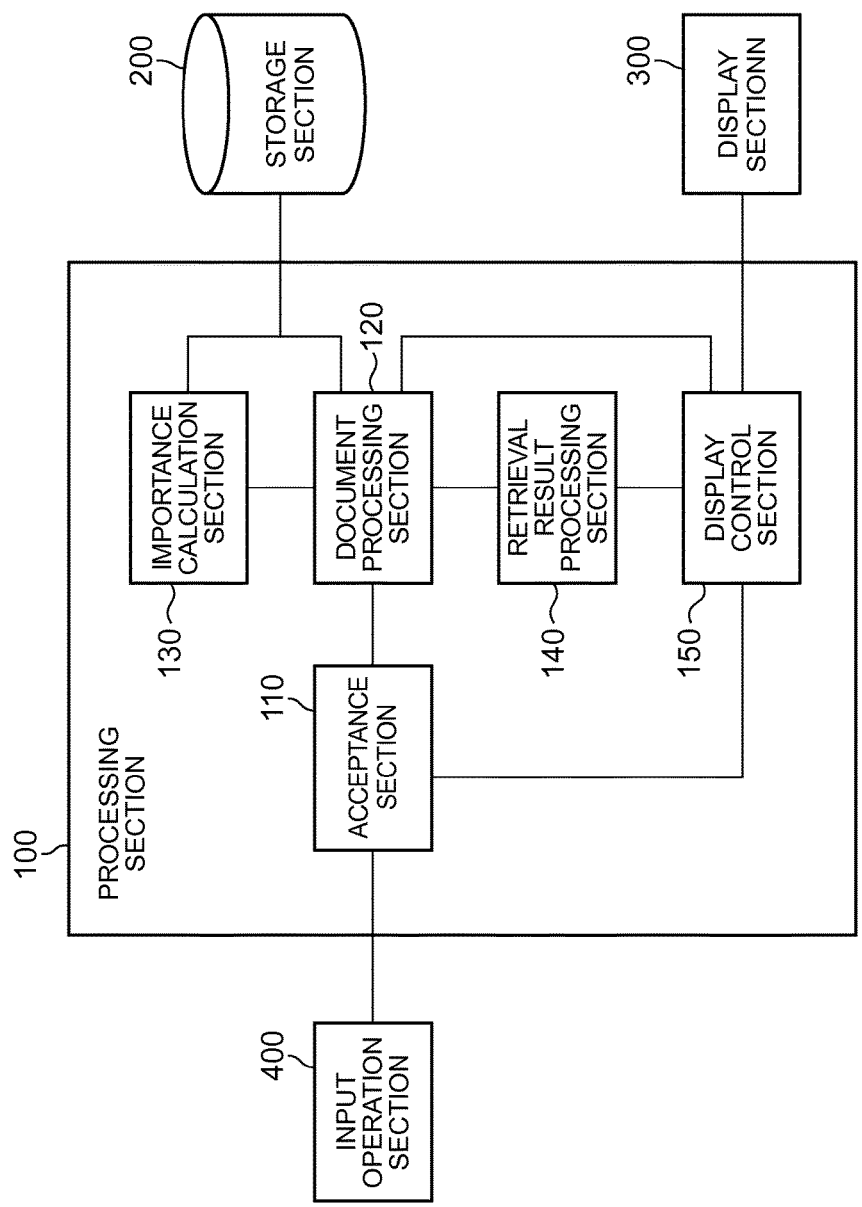
FIG. 1 is a block diagram showing an example of the functional configuration of an information processing apparatus to which an embodiment is applied.

In reading a document, another description of a specific phrase in the document may be desired to be referred to. For example, a reader may read over sentences that introduce a character during reading a novel, or may take into consideration a definitional description of a specific term in a research paper or the like. In such a case, in an electronic document browsing apparatus, a desired character string in a document can be retrieved using a data retrieval (character string retrieval) function. A sentence including the desired character string can also be retrieved from all sentences included in the document.

However, if the retrieved character string (keyword) exists in many portions of the document, the number of character strings and the number of sentences obtained as a result of the retrieval will become huge. This ends up making it difficult to find a target sentence.

In view of this problem, it is an object of the present invention to adjust the order of outputting retrieved sentences including a character string specified as a retrieval key during the retrieval of the sentences in order to improve user convenience.

In order to attain the above object, in one embodiment of the present invention is carried out as the following apparatus. This apparatus is an apparatus for retrieving and outputting a specific sentence included in a document, including: a retrieval key acquiring section for acquiring a retrieval key used to search a search target document; an importance calculation section for calculating the level of importance of each sentence included in the search target document; an extraction section for searching the search target document using the retrieval key acquired by the retrieval key acquiring section to extract a sentence including the retrieval key from the search target document in order to acquire position information on the extracted sentence in the document; an importance correction section for correcting a value of importance of each sentence calculated by the importance calculation section for the sentence extracted by the extraction section based on the position of the sentence in the search target document obtained by the extraction section to calculate a corrected level of importance; and a retrieval result outputting section for outputting the sentence extracted by the extraction section according to the order based on the corrected level of importance calculated by this importance correction section.

Specifically, in one embodiment of the present invention the importance calculation section calculates the level of importance of each sentence included in the search target document based on the number of appearances of a word included in the sentence across the document. More specifically, the importance calculation section calculates the level of importance of each sentence included in the search target document based on tf-idf (term frequency-inverse document frequency) of a word included in the document.

Furthermore specifically, in one embodiment of the present invention the importance correction section adds a larger weight value as each sentence is located more anteriorly in the search target document to correct the level of importance calculated for the sentence by the importance calculation section. Alternatively, the retrieval key acquiring section acquires, as the retrieval key, a portion identified by specifying a part or the whole of one sentence included in the search target document, and the importance correction section adds a larger weight value as each sentence is located closer to a sentence having the portion identified as the retrieval key in the search target document to correct the level of importance calculated for the sentence by the importance calculation section.

In order to attain the above object, another embodiment of the present invention is carried out as the following apparatus: This apparatus is an apparatus for retrieving and outputting a specific sentence included in a document, including: a display section for displaying a document; an acceptance section for accepting the specification of a specific portion in the document displayed on the display section; an extraction section for searching the document using, as a retrieval key, the specific portion in the document accepted by the acceptance section to extract a sentence including the retrieval key from the search target document in order to acquire position information on the extracted sentence in the document; a retrieval result processing section for determining the display order of each sentence extracted by the extraction section based on the level of importance determined for the sentence included in the document displayed on the display section based on the number of appearances of a word included in the sentence across the document, and the position information on the sentence extracted by the extraction section; and a display control section for causing the display section to display the sentence extracted by the extraction section according to the display order determined by this retrieval result processing section.

In order to attain the above object, still another embodiment of the present invention is carried out as the following method: This method is a method for retrieving a specific sentence from a document and causing a display section to display the specific sentence on a computer including the display section for displaying the document, including the steps of: accepting input of a retrieval key; searching the document based on the accepted retrieval key to extract a sentence including the retrieval key from the search target document in order to acquire position information on the extracted sentence in the document; based on the level of importance determined based on the number of appearances of a word included in each sentence across the document and the position information on the sentence extracted based on the retrieval key, determining the display order of the sentence included in the document displayed on the display section and extracted based on the retrieval key; and causing the display section to display the sentence extracted based on the retrieval key according to the determined display order.

Further, one embodiment of the present invention is carried out as a program for controlling a computer to implement each function of the above-mentioned apparatus, or a program for causing a computer to perform processing corresponding to each step mentioned above. This program can be distributed by storing it on a magnetic disk, an optical disk, a semiconductor memory, or any other recording medium, or delivered through a network.

According to one embodiment of the present invention, the order of outputting retrieved sentences during the retrieval of the sentences including a character string specified as a retrieval key can be adjusted to improve user convenience.

One or more embodiments of the present invention will be described in detail below with reference to the accompanying drawings.

FIG. 1 is a block diagram showing an example of the functional configuration of an information processing apparatus to which the embodiment is applied. The information processing apparatus to which the embodiment is applied is an apparatus for browsing an electronic document. A personal computer, a tablet information terminal, or a mobile information terminal such as a so-called smartphone can be used as the apparatus. The information processing apparatus shown in FIG. 1 includes a processing section 100, a storage section 200, a display section 300, and an input operation section 400. The processing section 100 performs processing on an electronic document to be processed. The specific functions of the processing section 100 in the embodiment will be described later. The storage section 200 stores the electronic document to be processed by the processing section 100. The storage section 200 also stores data obtained by the processing performed by the processing section 100.

The display section 300 is implemented by a display device such as a liquid crystal display to display, under the control of the processing section 100, the electronic document to be processed. The display section 300 also displays the results of processing performed by the processing section 100.

The input operation section 400 is an operation device for allowing a user to perform input operations. Specifically, a pointing device such as a mouse and a keyboard are used as the input operation section 400. A touch panel provided on the display screen of the display section 300 can also be used as the input operation section 400.

As shown in FIG. 1, the processing section 100 includes an acceptance section 110 for accepting user's input operations, a document processing section 120 as processing means, an importance calculation section 130, a retrieval result processing section 140, and a display control section 150 for controlling the display of the display section 300.

The acceptance section 110 accepts input entered using the input operation section 400. In the embodiment, for example, an instruction for specifying an electronic document and causing the display section 300 to display the electronic document, execution instructions for retrieval using a retrieval key and other various kinds of processing, and the like are entered and accepted by the acceptance section 110. The acceptance section 110 also accepts input of a retrieval key (keyword) entered using the input operation section 400. In other words, the acceptance section 110 also functions as a retrieval key acquiring section for acquiring the retrieval key. The retrieval key is entered, for example, with a keyboard keying operation or with an operation to specify an appropriate range (character string) using the pointing device in the electronic document displayed on the display section 300.

The document processing section 120 performs various kinds of processing based on the instructions and data accepted by the acceptance section 110. For example, the document processing section 120 reads a specified electronic document from the storage section 200 and causes the display section 300 to display the electronic document. Further, the document processing section 120 causes the importance calculation section 130 to calculate the level of importance of each sentence included in the electronic document read from the storage section 200. The document processing section 120 also functions as an extraction section for extracting a sentence including the retrieval key based on the entered retrieval key (character string) from among sentences included in the electronic document read from the storage section 200. At this time, the document processing section 120 also acquires information on the relative position of the extracted sentence (information indicating what number the sentence is among the sentences including the retrieval key, which is referred to as position information below). Further, the document processing section 120 sends the extracted sentence to the retrieval result processing section 140 to cause the retrieval result processing section 140 to perform processing.

The importance calculation section 130 calculates the level of importance of each sentence in the electronic document based on the number of appearances of a word included in each sentence. The calculated level of importance of the sentence is stored and held in the storage section 200. Then, the calculated level of importance is used in processing for outputting the retrieval result when the retrieval of the sentence based on the retrieval key is done. This importance calculation for the sentence involves a large calculation amount and hence the calculation load is large. Therefore, the calculation may be made in the background without waiting for a retrieval execution instruction when the electronic document is read by the document processing section 120, rather than that the calculation is made after the retrieval execution instruction is accepted. Further, when the information processing apparatus of the embodiment is connectable to a network such as the Internet, a server on the network is requested to make the calculation to acquire the calculation result. The details of a method of calculating the level of importance of a sentence by the importance calculation section 130 will be described later.

The retrieval result processing section 140 functions as an importance correction section for correcting the level of importance calculated by the importance calculation section 130 for the sentence extracted by the document processing section 120 based on the retrieval key. In the embodiment, the retrieval result processing section 140 changes the value of importance of the sentence based on the position information on the sentence acquired by the document processing section 120 when the sentence is extracted. The details of processing performed by the retrieval result processing section 140 will be described later.

The display control section 150 controls the display of the display section 300. Specifically, for example, the display control section 150 causes the display section 300 to display the electronic document to be displayed and acquired from the document processing section 120. The display control section 150 further performs display control such as page feeding or scroll of a display content based on an instruction accepted by the acceptance section 110 with the electronic document displayed on the display section 300. The display control section 150 also functions as a retrieval result outputting section for causing the display section 300 to display, as the retrieval result, the sentence extracted by the document processing section 120 based on the result of processing performed by the retrieval result processing section 140. The details of the display control of the retrieval result performed by the display control section 150 will be described later.

Importance Calculation for a Sentence

Next, the details of importance calculation for a sentence made by the importance calculation section 130 will be described in detail. In the embodiment, as mentioned above, the level of importance of each sentence in an electronic document is calculated based on the number of appearances of a word. Specifically, The importance calculation section 130 first determines the weight of each word in the electronic document using an existing algorithm called tf-idf. The tf-idf is determined using two indexes, namely an index called tf (term frequency) and an index called idf (inverse document frequency). Here, the tf is an index indicative of the frequency of appearance of each word in the electronic document. This is based on the idea that a word appearing frequently in the electronic document is an important word. The idf is an index indicative of the number of sentences including a certain word in the electronic document. This is based on the idea that a word used in sentences smaller in number represents the features of the sentences than a word used in many sentences.

In one embodiment of the present invention, the importance calculation section 130 focuses attention sequentially on each word appearing in the electronic document. Then, the importance calculation section 130 determines a value based on the above tf-idf (hereinafter, tf-idf value) for the focused word. Thus, the tf-idf value for each word appearing in the electronic document is determined.

Next, based on the level of importance (tf-idf value) of each word in the electronic document determined as mentioned above, the importance calculation section 130 determines the relevance between respective sentences in the electronic document. Specifically, the electronic document is represented by a graph with each sentence included in the electronic document as a node. Then, an edge between nodes in the graph is given a value (hereinafter, relevance) representing the relevance between two sentences corresponding to both end nodes of the edge as an attribute of the edge. This will be further described by taking a specific example.

Here, a description will be made about how the relevance between respective sentences is determined by taking, as an example, a document made up of three sentences (s1 to s3), namely, s1: "A cat is sitting on a mat.", s2: "A dog is sitting on a mat.", and s3: "A cat and a dog are sitting on a mat". First, a set of words (word space) included in these sentences is determined. Note that words "A(a)", "is", "on", "are", and the like in the above sentences are excluded from the word space as so-called stop words. The words as the stop words are set properly according to the system specifications and the like to which the embodiment is applied.

FIG. 2 is a diagram for describing the relevance among the above sentences s1 to s3. As shown in FIG. 2, four words "cat, sitting, mat, dog" are included in the word space obtained from s1 to s3. Then, among the words that make up each of the sentences (s1 to s3), a point is given to each word included in the word space to determine a score for each of the sentences (s1 to s3). At this time, a tf-idf value of each word is actually given as a point to the word, but it is assumed here that one point is given to one word for the sake of simplicity. For example, among the words included in the word space, one "cat", one "sitting", and one "mat" are in s1. Since one point is given to each word, score v1 for s1 becomes v1: (cat:1, sitting:1, mat:1, dog:0) as shown in FIG. 2. In the same way, score v2 for s2 becomes v2: (cat:0, sitting:1, mat:1, dog:1), and score v3 for s3 becomes v3: (cat:1, sitting:1, mat:1, dog:1).

Next, based on the above scores (v1 to v3), the relevance between respective sentences are determined. In the above example, since there are three sentences (s1 to s3), the relevance between s1 and s2, the relevance between s1 and s3, and the relevance between s2 and s3 are determined, respectively. The relevance between s1 and s2 is specifically considered. The three words ("cat", "sitting", "mat") are in s1, and two words ("sitting", "mat") are in common with s2. On the other hand, three words ("sitting", "mat", "dog") are in s2, and two words ("sitting", "mat") are in common with s1. The relevance (v1:v2) between s1 and s2 is expressed as a ratio of the number of common words to the total number of words in the two sentences (s1, s2), i.e., $(2+2)/(3+3) \cong 0.66$.

In regard to the relevance (v1:v3) between s1 and s3, three words ("cat", "sitting", "mat") are in s1, and all the words are in common with s3. On the other hand, four words ("cat", "sitting", "mat", "dog") are in s3, and three words ("cat", "sitting", "mat") are in common with s1. The relevance (v1:v3) between s1 and s3 becomes $(3+3)/(3+4) \cong 0.86$. In the same way, the relevance (v2:v3) between s2 and s3 becomes $(3+3)/(3+4) \cong 0.86$.

In the graph representing the electronic document, the relevance between respective sentences calculated as mentioned above is given as an attribute to each of the edges respectively established among node s1 to node s3 corresponding to the sentences (s1 to s3). Referring to FIG. 2, a value of "0.66" is given to the edge between node s1 and node s2, a value of "0.86" is given to the edge between node s1 and node s3, and a value of "0.86" is given to the edge between node s2 and node s3. As mentioned above, one point is given to each word included in the word space of each sentence in the above example to calculate the score for each sentence and the relevance, but a tf-idf value is actually given as a point to each word. Therefore, the score and relevance are also calculated for each sentence by using the tf-idf value of each word.

Next, based on the relevance between respective sentences determined as mentioned above, the importance calculation section 130 calculates the level of importance of each sentence based on the eigenvector centrality for each sentence. The importance calculation section 130 first creates an adjacency matrix based on a graph representing the electronic document to which the relevance between respective sentences is given as mentioned above.

FIG. 3 is a diagram showing an adjacency matrix based on the graph shown in FIG. 2. In FIG. 3, among elements in matrix A, a value of relevance given to each edge is described in each element corresponding to each edge in the graph shown in FIG. 2. The importance calculation section 130 calculates an eigenvector corresponding to the maximum eigenvalue in such matrix A, and sets the element (value) of the calculated eigenvector as the value of importance of each sentence. The importance calculation section 130 further performs ranking based on the importance of each sentence in descending order of the element (value) of this eigenvector. An existing technique can be used as a technique for calculating the maximum eigenvalue of the adjacency matrix and the eigenvector based on the graph representing the electronic document like matrix A.

As described above, the importance calculation for each sentence in the embodiment is processing performed based only on information included in the electronic document to be processed (i.e., in a closed environment). The calculated importance of each sentence in the electronic document is stored in the storage section 200.

Sentence Retrieval Processing

Next, sentence retrieval processing performed by the document processing section 120 will be described. In the embodiment, the document processing section 120 extracts sentences including a retrieval key based on the retrieval key (keyword) accepted by the acceptance section 110 from an electronic document to be processed. The document processing section 120 further acquires position information on the extracted sentence.

Figure 4:
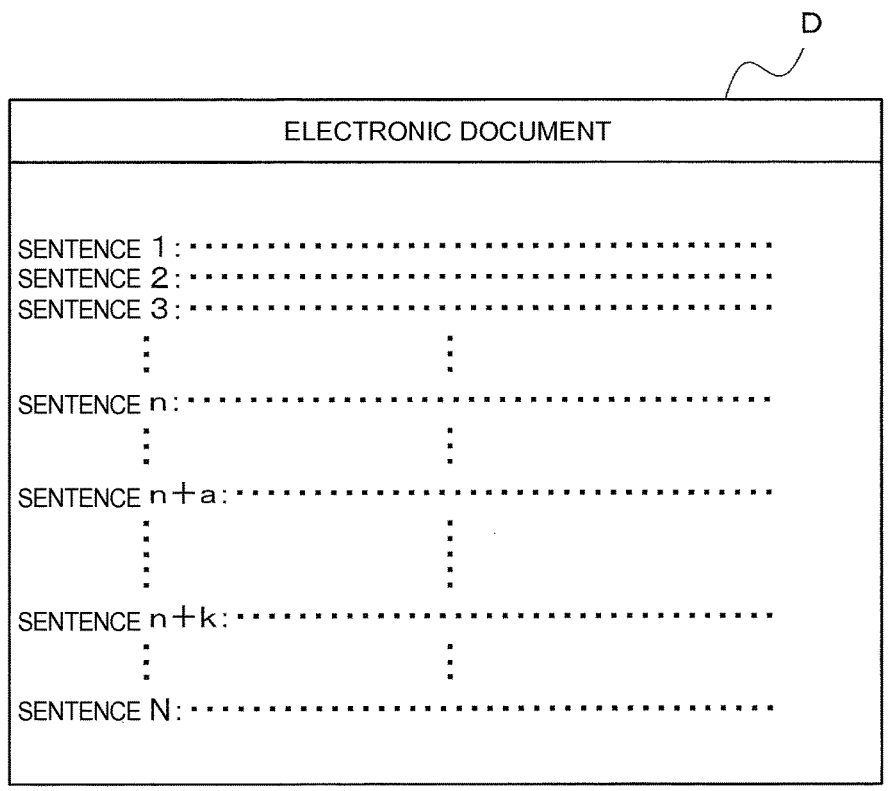
FIG. 4 is a diagram for describing sentence extraction in the embodiment.

FIG. 4 is a diagram for describing sentence extraction in the embodiment. Electronic document D shown in FIG. 4 is made up of N sentences from "sentence 1" as the first sentence to "sentence N" as the last sentence. Sentence n is a sentence appearing first in electronic document D as including the retrieval key. In other words, since the retrieval key is not included in sentences before sentence n, the sentences are excluded from extraction. Sentence n+a is a sentence including the retrieval key and located posterior to sentence n. Sentence n+k is the last sentence including the retrieval key. In FIG. 4, although no sentence is shown after sentence n+k, sentences that do not include the retrieval key may follow.

Next, the document processing section 120 normalizes position information "n, n+k" on each of the sentences from sentence n to sentence n+k extracted based on the retrieval key. In other words, the position information is so converted that a value of "n, n+k" will be "0, 1". Thus, specific position x(n+a) of sentence n+a is expressed as x(n+a)=a×(1/k).

Importance Correction Based on Sentence Position Information

Next, sentence importance correction made by the retrieval result processing section 140 will be described. In the embodiment, the retrieval result processing section 140 reads, from the storage section 200, the levels of importance of sentences extracted by the document processing section 120. Then, based on position information on each of the sentences including the retrieval key and acquired by the document processing section 120, the retrieval result processing section 140 corrects the level of importance of the corresponding sentence.

Figure 5:
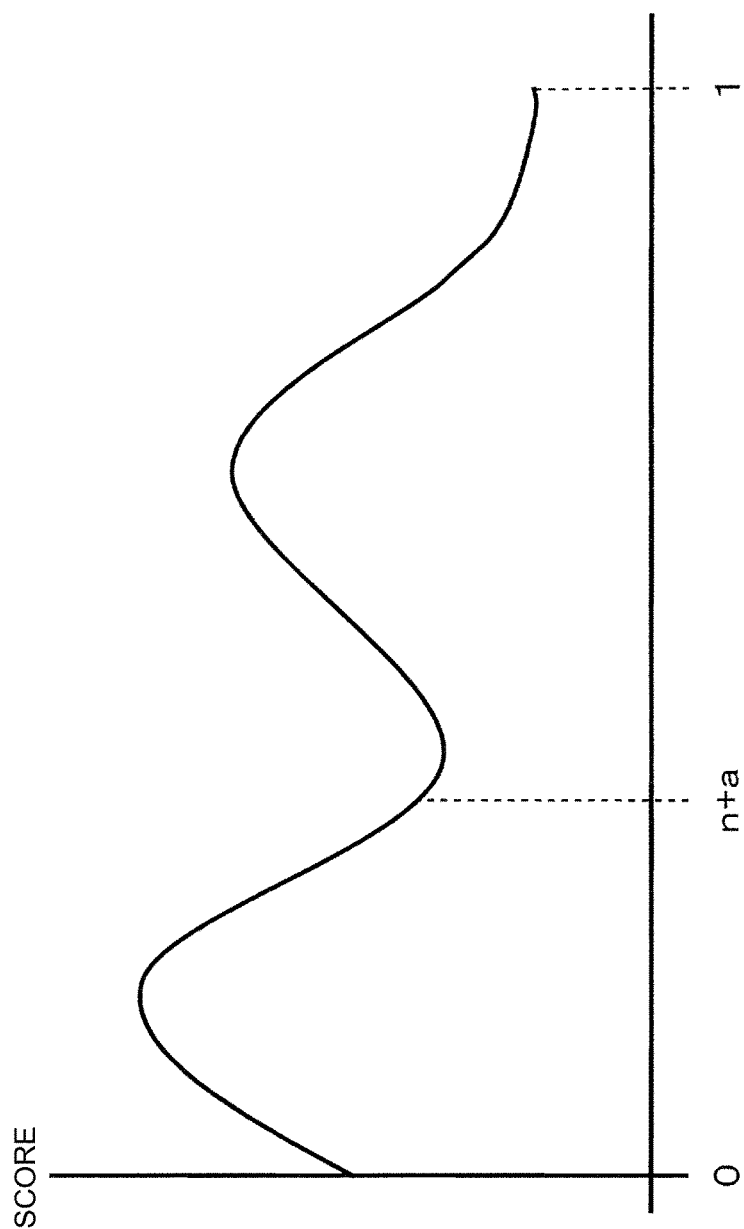
FIG. 5 is a graph showing an example of the importance of each sentence before corrected by a retrieval result processing section.

FIG. 5 is a graph showing an example of the importance of each sentence before corrected by the retrieval result processing section 140. In FIG. 5, the abscissa shows position information on each sentence extracted by the document processing section 120. In other words, a point with value "0" (the left end of the graph) is the first sentence including the retrieval key, a point with value "1" (the right end of the graph) is the last sentence including the retrieval key. Further, the ordinate shows the level of importance of each sentence at "0, 1".

In the embodiment, as processing for correcting the level of importance of each sentence, the following processing is performed: (1) processing for giving a larger weight value to a sentence located more anteriorly, or (2) processing for giving a larger weight value to a sentence located closer to a sentence used to specify the retrieval key. The former is based on the assumption (assumption 1) that "the importance of the sentence located more anteriorly is higher". The latter is based on the assumption (assumption 2) that "the importance of the sentence located closer to the sentence used to specify the retrieval key is higher".

Assumption 1 will be described. A case where it is desired to get information on a specific phrase (a character, a location, or the like) is considered. When the content of an electronic document is a story such as a novel, an introductory description of a phrase that becomes a key to the story is often given in an anterior sentence such as in a sentence in which the phrase appears first. When the content of the electronic document is a research paper, a definitional description of a phrase that becomes a key to the main thesis is often given in a sentence in which the phrase appears first. Thus, an assumption that, among sentences including a specific phrase, an anterior sentence is likely to be a sentence in which the description or definition of the phrase is given and which is of high importance is established. Therefore, weighting based on assumption 1 is done as the processing for correcting the level of importance of each sentence.

Figure 6:
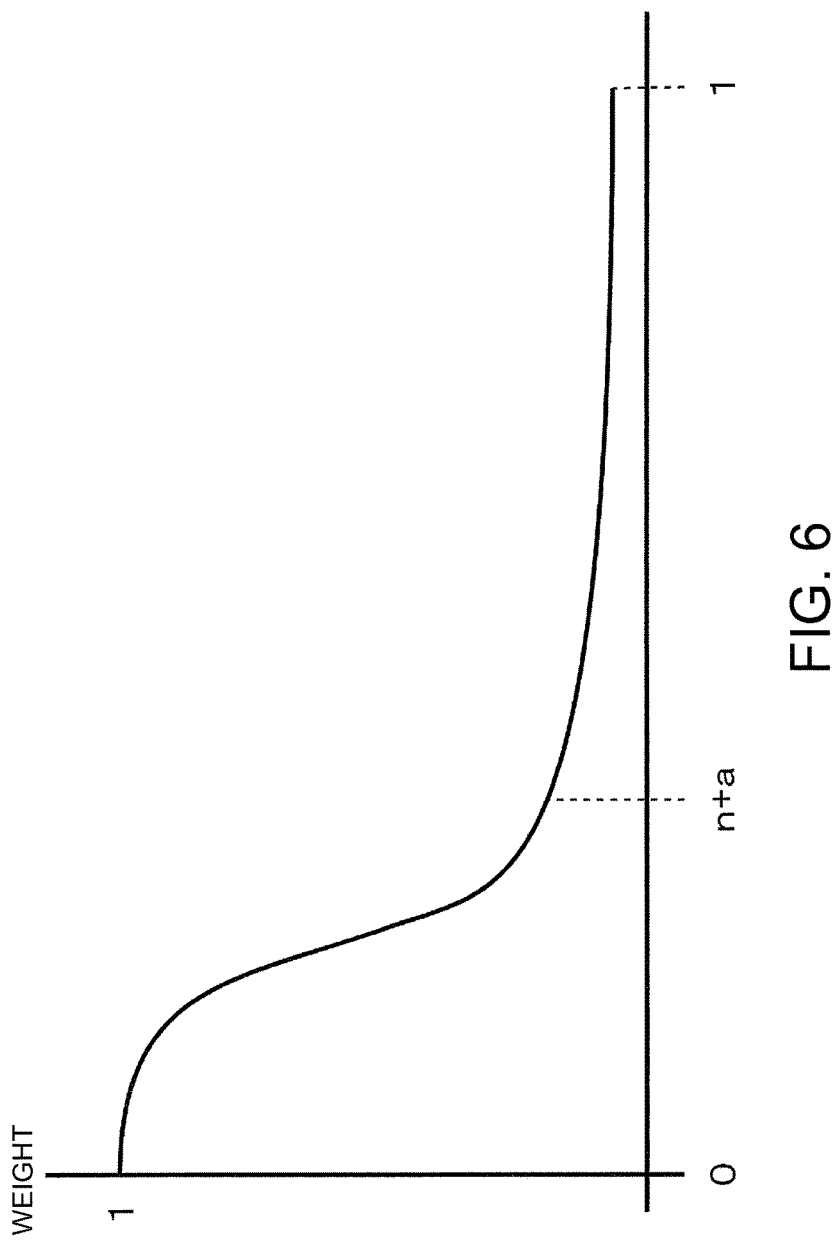
FIG. 6 is a graph showing an example of weighting in correcting the level of importance of each sentence.

FIG. 6 is a graph showing an example of weighting based on assumption 1. In FIG. 6, the abscissa shows position information on each sentence extracted by the document processing section 120 like in the graph shown in FIG. 5. Further, the ordinate shows the weight value given to each sentence. In the example shown in FIG. 6, the weight value for a left-hand sentence (an anterior sentence in the electronic document) is large. In the example shown, the maximum weight value is "1". All that is required that the weight value given to the anterior sentence becomes large in the weighting based on assumption 1. The specific weight value for each sentence is set properly according to the kind of electronic document or the like. Note that the curved graph line shown is FIG. 6 is just an illustrative example.

Based on the value of the importance read from the storage section 200 and the weight value defined in the example shown in FIG. 6, the retrieval result processing section 140 calculates a value for the final level of importance of each sentence extracted by the document processing section 120 and to be reflected in the output of retrieval results. Specifically, for example, if the value of importance of sentence n+a read from the storage section 200 is s(n+a) and the weight value defined as in FIG. 6 is b(n+a), a value W(n+a) for the final level of importance is determined by the following equation: W(n+a)=s(n+a)+s(n+a)×b(n+a). Note that this math formula for weighting is just an illustrative example, and the weighting calculation is not limited to this math formula. In practice, the math formula can be set properly according to the content of the electronic document or the like.

Next, assumption 2 will be described. There may be a case where, after reading a sentence in an electronic document, a reader wants to refer to what description is given to a certain phrase in the sentence somewhere around the sentence. This is a case where the reader wants to check what description is given to the phrase a while back, or to know how the certain phrase is described in a specific range (a chapter or a section) including the sentence being currently read. Thus, separately from assumption 1 mentioned above, an assumption that, among sentences including a specific phrase, a sentence located close to a specific sentence is likely to be a sentence desired by the reader to read and being of high importance is established. Therefore, weighting based on assumption 2 is done as the processing for correcting the level of importance of each sentence.

Figure 7:
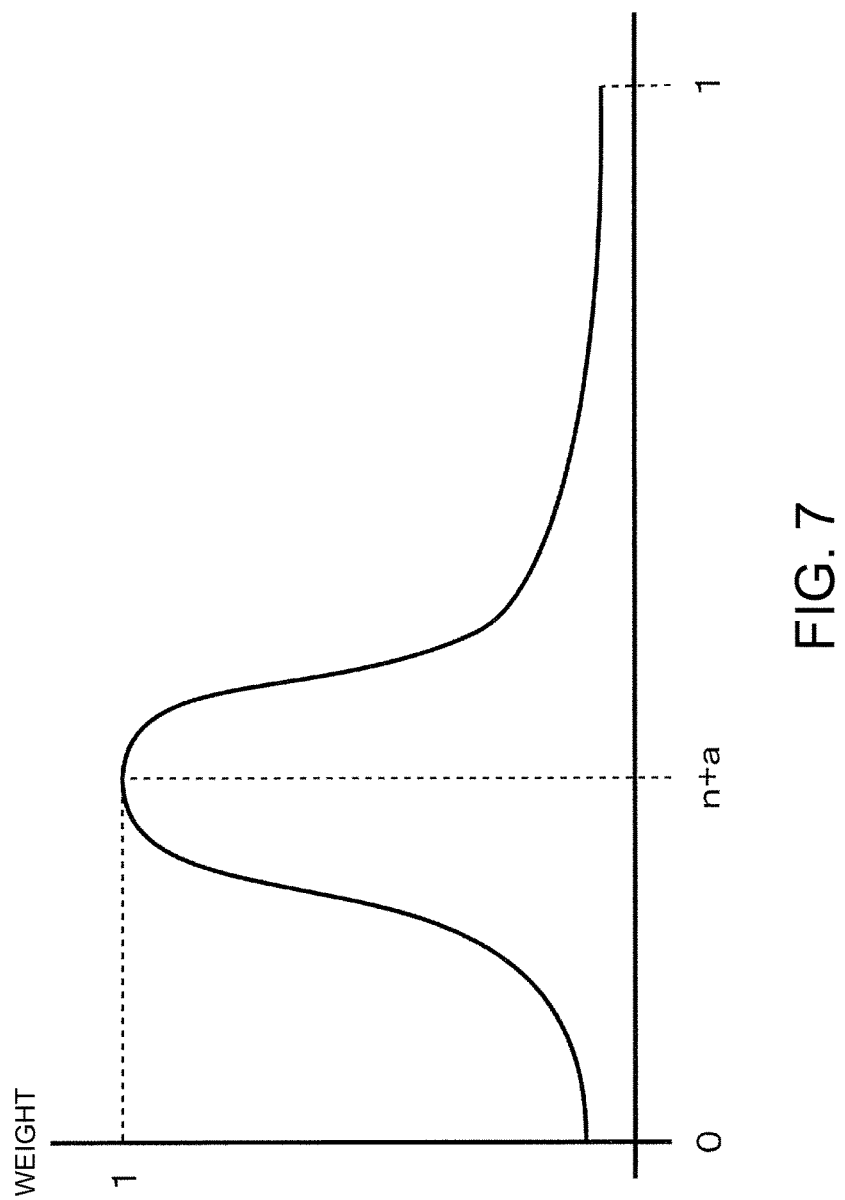
FIG. 7 is a graph showing another example of weighting in correcting the level of importance of each sentence.

FIG. 7 is a graph showing an example of weighting based on assumption 2. In FIG. 7, the abscissa shows position information on each sentence extracted by the document processing section 120 like in the graph shown in FIG. 5. Further, the ordinate shows the weight value given to each sentence. In the example shown in FIG. 7, the closer to a specified sentence (sentence n+a) the position of a sentence, the larger the weight value. In the example shown, the maximum weight value is "1". All that is required that the closer to the specified sentence the position of the sentence, the larger the weight value in the weighting based on assumption 2. The specific weight value for each sentence is set properly according to the kind of electronic document or the like. Note that the curved graph line shown is FIG. 7 is just an illustrative example.

Based on the value of importance read from the storage section 200 and the weight value defined in the example shown in FIG. 7, the retrieval result processing section 140 calculates a value for the final level of importance to be reflected in the output of retrieval results. The specific calculation method is the same as that in the case of assumption 1 described with reference to FIG. 6.

As mentioned above, assumption 1 and assumption 2 are different in terms of the basis for the weight given to the importance of each sentence. Therefore, the importance based on assumption 1 and the importance based on assumption 2 are typically corrected separately. In the actual operation, for example, when accepting a retrieval execution instruction, the acceptance section 110 accepts a selection instruction on which importance is to be corrected, and the correction method may be switched according to this selection instruction. Further, the correction based on assumption 1 may be made essentially so that the correction based on assumption 2 will be made only when an instruction is particularly accepted.

As mentioned above, the weighting based on assumption 2 is determined based on the position of the sentence specified first. In other words, if the sentence specified first is different, the shape of the graph shown in FIG. 7 changes. Therefore, when the importance correction based on assumption 2 is to be made, one sentence needs to be specified first. Specifically, when accepting the specification of a retrieval key, the acceptance section 110 accepts a phrase included in the specific sentence as the retrieval key. For example, an interface for accepting the specification of a specific range of the displayed sentence (a part or the whole of the sentence) on condition that the electronic document to be processed is displayed on the display section 300, accepting a character string in the specified range as a retrieval key, and specifying sentences including the specified character string can be considered.

On the other hand, the weighting based on assumption 1 is based only on the position of each sentence including the retrieval key. In this case, the graph shown in FIG. 6 remains unchanged. In other words, it does not matter in which sentence the specified retrieval key is included as a phrase. Therefore, for example, a character string entered using a device such as a keyboard irrespective of the sentences in the electronic document may be accepted as the retrieval key.

As described above, the level of importance of each sentence is corrected based on the position information on each sentence extracted by the document processing section 120. Here, since the level of importance is corrected by the retrieval result processing section 140, the ranking of each sentence based on the importance given by the importance calculation section 130 may be changed. The changed ranking reflects the position of each sentence including the retrieval key.

Output of Retrieval Results

The display control section 150 causes the display section 300 to display sentences (sentences including the retrieval key) extracted by the document processing section 120 according to the rankings based on the levels of importance (corrected levels of importance) corrected by the retrieval result processing section 140. Specifically, for example, an area for displaying the retrieval results is formed on the display screen of the display section 300 to display the sentences in this area according to the corrected rankings from the highest.

Figure 8:
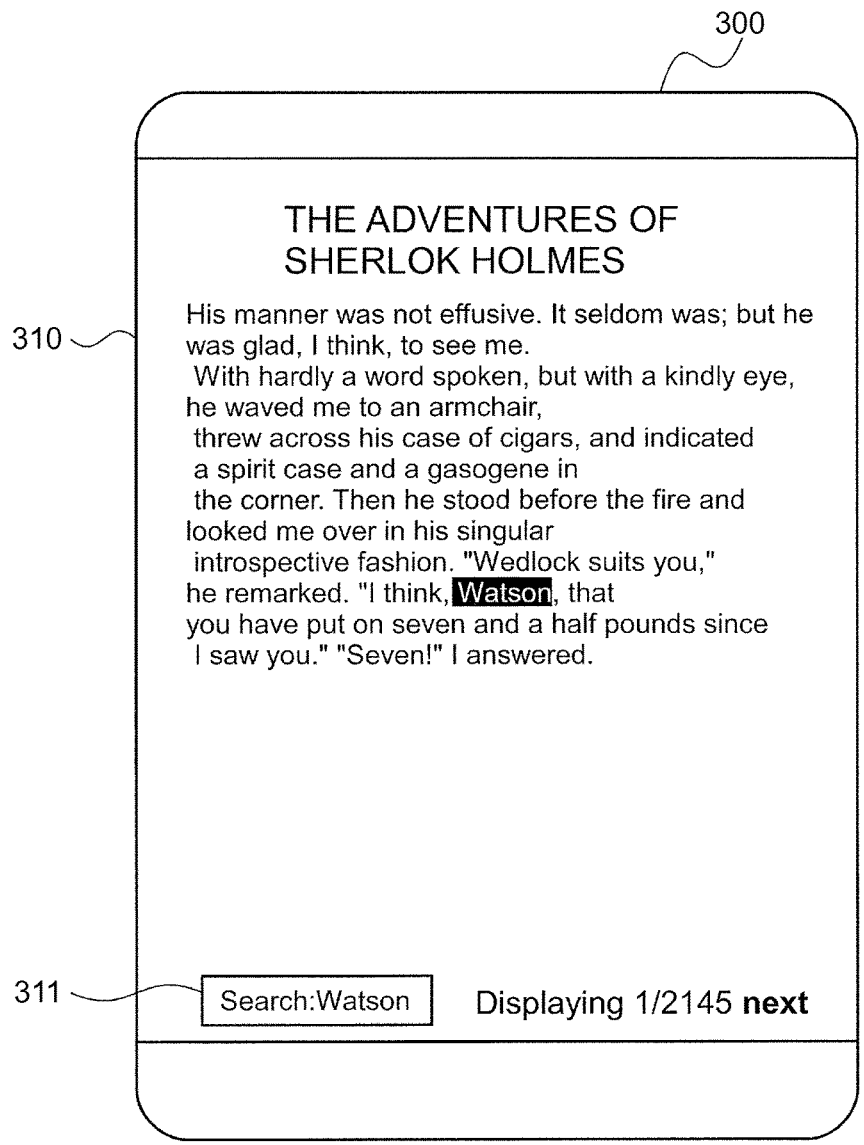
FIG. 8 is an illustration showing an example of a display screen of a display section controlled by a display control section, indicating a display example during retrieval processing.
Figure 9:
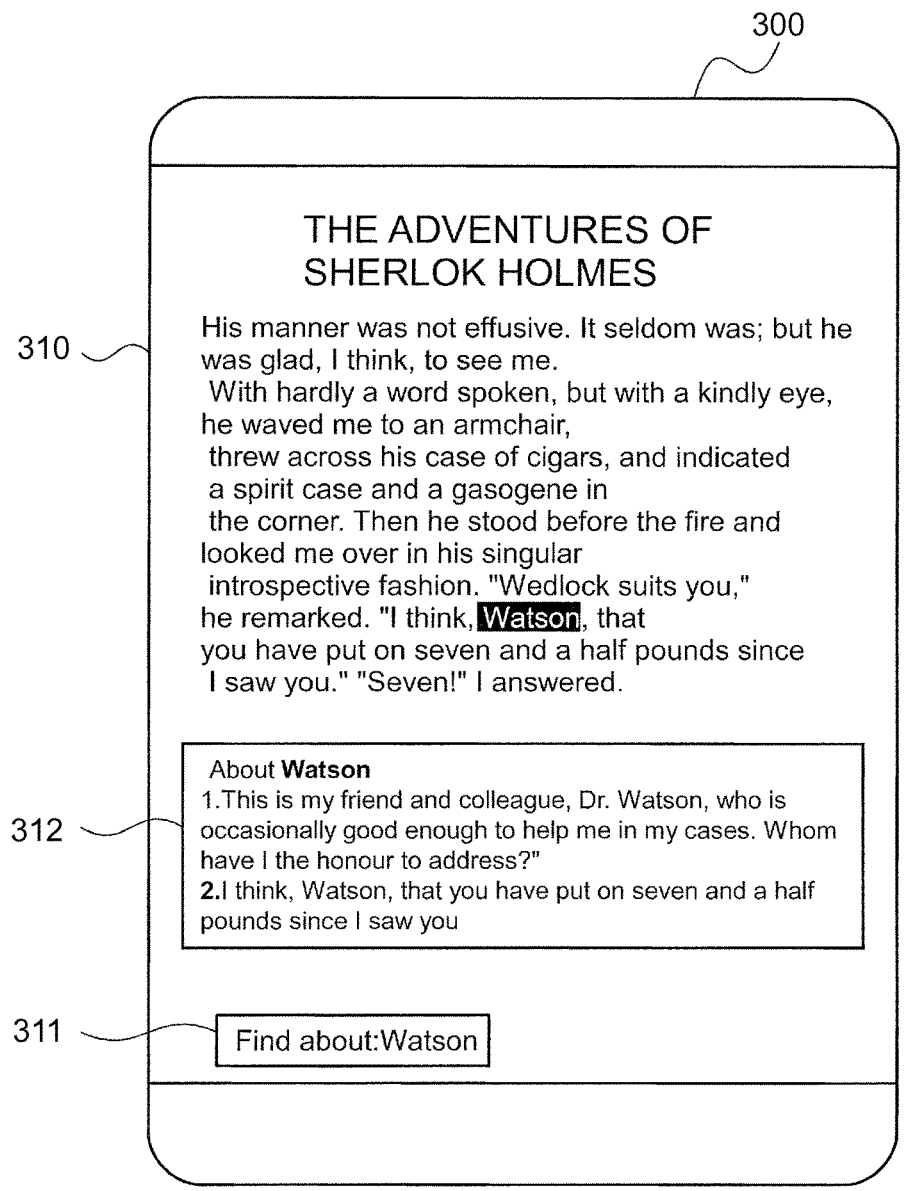
FIG. 9 is an illustration showing another example of the display screen of the display section controlled by the display control section, indicating a display example after the retrieval processing is performed.

FIG. 8 and FIG. 9 are illustrations showing an example of the display screen of the display section 300 controlled by the display control section 150. Referring to FIG. 8, an electronic document to be processed is displayed on a display screen 310 of the display section 300. This is to display an electronic document read by the document processing section 120 from the storage section 200 according to a display instruction accepted by the acceptance section 110. A retrieval key displaying area 311 for displaying a specified retrieval key is formed on the display screen 310. A character string "Search" indicating that retrieval processing is in progress and a retrieval key "Watson" are displayed in the retrieval key displaying area 311 shown in FIG. 8. In the example shown in FIG. 8, the retrieval key "Watson" is entered by specifying the character string "Watson" in the tenth line of text (with the title "THE ADVENTURES OF SHERLOK HOLMES" excluded) in the electronic document displayed on the display screen 310. In the display example shown in FIG. 8, the display is so controlled that the specified character string "Watson" will be highlighted to make the specified portion visually identifiable.

When the retrieval by the document processing section 120 is completed and the ranking of each sentence including the extracted retrieval key "Watson" based on the corrected level of importance is determined by the retrieval result processing section 140, the retrieval result is displayed according to the determined ranking. Referring to FIG. 9, a retrieval result displaying area 312 is newly formed on the display screen 310 of the display section 300. Then, sentences higher in ranking based on the corrected levels of importance are displayed in this retrieval result displaying area 312. Although two sentences are displayed in the retrieval result displaying area 312 shown in FIG. 9, the number of sentences to be displayed is not limited to the example shown. The number of sentences to be displayed is determined according to the size of the retrieval result displaying area 312 and the length of sentences to be displayed. Further, the display content of the retrieval result displaying area 312 can be scrolled or updated to enable sentences lower in ranking based on the corrected levels of importance to be displayed. In the example shown in FIG. 9, since the retrieval of sentences including the retrieval key "Watson" is completed, a character string "Find about" indicative of the completion of the retrieval processing is displayed in the retrieval key displaying area 311 instead of the character string "Search".

In the above example, a character string in the electronic document displayed on the display screen 310 of the display section 300 is specified to specify a retrieval key, but a character string as the retrieval key may be directly entered using the keyboard or the like. In this case, however, since the character string included in a specific sentence is not specified as the retrieval key, only the importance correction based on the assumption (assumption 1) that "the level of importance of a sentence located more anteriorly is higher" can be applied.

Operation of Processing Section

Figure 10:
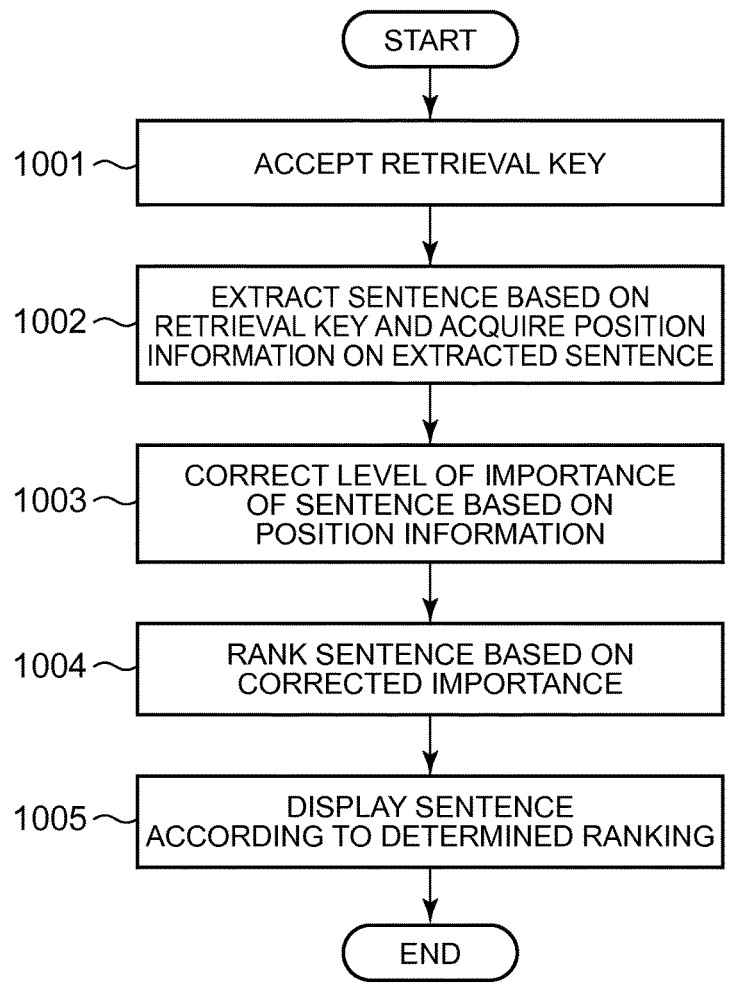
FIG. 10 is a flowchart for describing the operation of a processing section of the embodiment.

FIG. 10 is a flowchart for describing the operation of the processing section 100 when the information processing apparatus configured as mentioned above retrieves sentences based on a retrieval key. Here, it is assumed that the importance calculation for each sentence in an electronic document made by the importance calculation section 130 in the background or the like is completed before an execution instruction for retrieval processing is given. When the retrieval processing is performed, the acceptance section 110 first accepts input of a retrieval key (step 1001). Next, based on the accepted retrieval key, the document processing section 120 extracts each sentence including this retrieval key from the electronic document to be processed. The document processing section 120 further acquires position information on the extracted sentence (step 1002).

Next, based on the position information acquired by the document processing section 120, the retrieval result processing section 140 corrects the level of importance of the sentence extracted by the document processing section 120 (step 1003). Then, based on the corrected level of importance, each sentence extracted by the document processing section 120 is ranked (step 1004). After that, the display control section 150 causes the display section 300 to display each sentence according to the ranking (display order) determined in step 1004 (step 1005).

Example of Hardware Configuration

Figure 11:
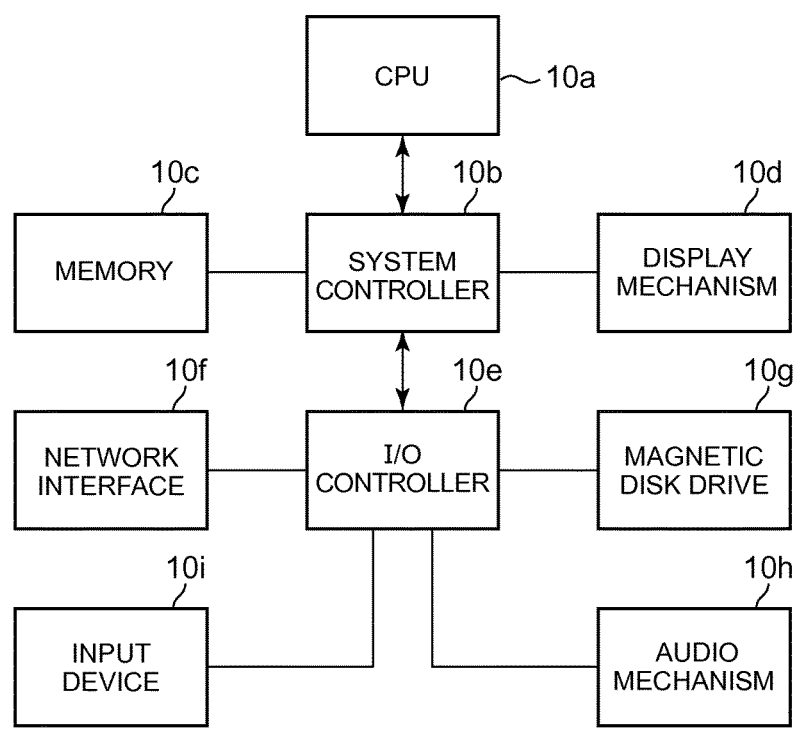
FIG. 11 is a block diagram showing a hardware configuration example preferred to configure the information processing apparatus of the embodiment.

FIG. 11 is a block diagram showing a hardware configuration example preferred to configure the information processing apparatus of the embodiment. Here, a case where the hardware configuration is applied to a computer will be described. The computer shown in FIG. 11 includes a CPU (Central Processing Unit) 10a as computing means and a memory 10c as main storage means. The computer further includes, as external devices, a magnetic disk drive (HDD: Hard Disk Drive) 10g, a network interface 10f, a display mechanism 10d including a display device, an audio mechanism 10h, and an input device 10i such as a keyboard and a mouse.

In the configuration example shown in FIG. 11, the memory 10c and the display mechanism 10d are connected to the CPU 10a through a system controller 10b. The network interface 10f, the magnetic disk drive 10g, the audio mechanism 10h, and the input device 10i are connected to the system controller 10b through an I/O controller 10e. The respective components are connected by various buses such as a system bus and an I/O bus.

Note that FIG. 11 is an illustrative example of the hardware configuration of the computer preferred to apply the embodiment. The embodiment can be applied widely to information processing apparatuses capable of displaying an electronic document to make the electronic document readable and capable of retrieving sentences based on a retrieval key. Note that the embodiment is not implemented only in the configuration shown.

In FIG. 11, an OS program and application programs are stored in the magnetic disk drive 10g. Then, these programs are read into the memory 10c and executed by the CPU 10a to implement each function of the processing section 100 in the embodiment. The storage section 200 is implemented by storage means such as the memory 10c and the magnetic disk drive 10g. The display section 300 is configured by the display mechanism 10d. The input operation section 400 corresponds to the input device 10i.

In the above configuration example, the electronic document to be processed is prestored in the storage section 200 inside the apparatus and read by the document processing section 120, but the electronic document held in an external storage device may be acquired as a target to be processed. In this case, for example, an electronic document to be read can be acquired from an external storage device provided on a network through the network interface 10f shown in FIG. 11. Other forms with various changes or improvements added to the above embodiment are also included in the technical scope of the present invention.

To adjust the order of outputting retrieved sentences during the retrieval of sentences including a character string specified as a retrieval key in order to improve user convenience.

As described herein, one embodiment of the present invention presents: an acceptance section 110 for acquiring a retrieval key; an importance calculation section 130 for calculating the level of importance of each sentence included in a search target document, a document processing section 120 for extracting a sentence including the retrieval key from the search target document based on the retrieval key acquired by the acceptance section 110 to acquire position information on the extracted sentence in the document; a retrieval result processing section 140 for correcting a value of importance of each sentence calculated by the importance calculation section 130 for the sentence extracted by this document processing section 120 based on the position of the sentence in the search target document obtained by the document processing section 120 to calculate a corrected level of importance, and a display control section 150 for outputting the sentence extracted by the document processing section 120 according to the display order based on this corrected level of importance.

Note that the terms "section", "component", and "hardware component" are used interchangeably in one or more embodiments of the present invention to describe a unit of hardware that performs one or more described and/or claimed features of the present invention.

Note also that the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. An apparatus for retrieving and outputting a specific sentence included in a document, the apparatus comprising:
  a retrieval key acquiring hardware component for acquiring from a user an input of a retrieval key used to search a search target document, the retrieval key to determine a display sequence of sentences extracted from the search target document in response to the search;
  an importance calculation hardware component for calculating an initial level of importance of each sentence included in the search target document, wherein the initial level of importance is determined by executing steps to:
    determine, for a first sentence in the search target document, a row vector having elements corresponding to each sentence in the search target document, wherein a first element of the row vector has a first position in the row vector corresponding to a position of a second sentence in the search target document and a value corresponding to a relevance between the first sentence and the second sentence,
    generate a matrix having rows corresponding to each sentence in the search target document, wherein a first row located at the first position amongst rows of the matrix is the first vector, and
    generate an eigenvector corresponding to a maximum eigenvalue of the matrix, wherein an initial level of importance of the first sentence is a value of a second element of the eigenvector located at the first position in the eigenvector;
  an extraction hardware component for searching the search target document using the retrieval key acquired by the retrieval key acquiring hardware component to extract a sentence including the retrieval key from the search target document in order to acquire position information on the extracted sentence in the document;
  an importance correction hardware component for correcting a value of importance of each sentence calculated by the importance calculation hardware component for the sentence extracted by the extraction hardware component based on the position of the sentence in the search target document obtained by the extraction hardware component to calculate a corrected level of importance; and
  a retrieval result outputting hardware component for outputting the sentence extracted by the extraction hardware component according to an order based on the corrected level of importance calculated by the importance correction hardware component.

2. The apparatus according to claim 1, wherein the relevance between the first sentence and the second sentence is determined based on based on a number of appearances of words included in the first sentence and in the second sentence across the document.

3. The apparatus according to claim 1, wherein the importance correction hardware component adds a larger weight value as each sentence is located more anteriorly in the search target document to correct the initial level of importance calculated for the sentence by the importance calculation hardware component.

4. The apparatus according to claim 1, wherein:
  the retrieval key acquiring hardware component acquires from a user, as the retrieval key, a portion identified by specifying a part or a whole of one sentence included in the search target document, and
  the importance correction hardware component adds a larger weight value as each sentence is located closer to a sentence having the portion identified as the retrieval key in the search target document to correct the initial level of importance calculated for the sentence by the importance calculation hardware component.

5. The apparatus according to claim 1, wherein the importance calculation hardware component calculates the relevance between the first sentence and the second sentence is determined based on based on a term frequency-inverse document frequency (tf-idf) of words included in the search target document.

6. An apparatus for retrieving and outputting a specific sentence included in a document, the apparatus comprising:
a display hardware component for displaying a document;
an acceptance hardware component for accepting a specification of a specific portion in the document displayed on the display hardware component;
an extraction hardware component for searching the document using, as a retrieval key, the specific portion in the document accepted by the acceptance hardware component to extract a sentence including the retrieval key from the search target document in order to acquire position information on the extracted sentence in the document;
a retrieval result processing hardware component for determining a display order of each sentence extracted by the extraction hardware component based on an initial level of importance determined for the sentence included in the document displayed on the display hardware component based on the number of appearances of a word included in the sentence across the document, and the position information on the sentence extracted by the extraction hardware component, wherein the initial level of importance is determined by executing steps to:
determine, for a first sentence in the document, a row vector having elements corresponding to each sentence in the document, wherein a first element of the row vector has a first position in the row vector corresponding to a position of a second sentence in the document and a value corresponding to a relevance between the first sentence and the second sentence,
generate a matrix having rows corresponding to each sentence in the document, wherein a first row located at the first position amongst rows of the matrix is the first vector, and
generate an eigenvector corresponding to a maximum eigenvalue of the matrix, wherein an initial level of importance of the first sentence is a value of a second element of the eigenvector located at the first position in the eigenvector; and
a display control hardware component for causing the display hardware component to display the sentence extracted by the extraction hardware component according to the display order determined by the retrieval result processing hardware component.

7. The apparatus according to claim 6, wherein the retrieval result processing hardware component determines the display order of each sentence extracted by the extraction hardware component based on a value obtained by adding a larger weight value to the initial level of importance of the sentence extracted by the extraction hardware component as the sentence is determined based on the position information to be located more anteriorly in the document.

8. The apparatus according to claim 6, wherein the retrieval result processing hardware component determines the display order of each sentence extracted by the extraction hardware component based on a value obtained by adding a larger weight value to the initial level of importance of the sentence extracted by the extraction hardware component as the sentence is determined based on the position information to be located closer in the document to a sentence with the retrieval key specified therein.

9. A method for retrieving a specific sentence from a document and causing a display hardware component to display the specific sentence on a computer including the display hardware component for displaying the document, the method comprising:
accepting, by one or more processors, an input of a retrieval key;
searching, by one or more processors, the document based on the accepted retrieval key to extract a sentence including the retrieval key from the search target document in order to acquire position information on the extracted sentence in the document, wherein the retrieval key determines a display sequence of sentences extracted from the search target document in response to the search;
determining, by one or more processors based on an initial level of importance determined based on the number of appearances of a word included in each sentence across the document and the position information on the sentence extracted based on the retrieval key, a display order of the sentence included in the document displayed on the display hardware component and extracted based on the retrieval key, wherein the initial level of importance is determined by executing steps to:
determine, for a first sentence in the document, a row vector having elements corresponding to each sentence in the document, wherein a first element of the row vector has a first position in the row vector corresponding to a position of a second sentence in the document and a value corresponding to a relevance between the first sentence and the second sentence,
generate a matrix having rows corresponding to each sentence in the document, wherein a first row located at the first position amongst rows of the matrix is the first vector, and
generate an eigenvector corresponding to a maximum eigenvalue of the matrix, wherein an initial level of importance of the first sentence is a value of a second element of the eigenvector located at the first position in the eigenvector; and
causing, by one or more processors, the display hardware component to display the sentence extracted based on the retrieval key according to the determined display order.

* * * * *